United States Patent
Lin (10) Patent No.: US 12,536,269 B2
(45) Date of Patent: Jan. 27, 2026

(54) DYNAMIC CONSENT MANAGEMENT PLATFORM AND PERSONAL INFORMATION MANAGEMENT METHOD THEREOF

(71) Applicant: National Taiwan University of Science and Technology, Taipei (TW)

(72) Inventor: Jui-Chu Lin, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 232 days.

(21) Appl. No.: 18/383,274

(22) Filed: Oct. 24, 2023

(65) Prior Publication Data
US 2024/0134957 A1 Apr. 25, 2024
US 2024/0232323 A9 Jul. 11, 2024

(30) Foreign Application Priority Data

Oct. 25, 2022 (TW) .................................. 111211618
Nov. 3, 2022 (TW) .................................. 111141989
Dec. 28, 2022 (TW) .................................. 111214427

(51) Int. Cl.
*G06F 21/45* (2013.01)
*G06F 16/27* (2019.01)
*G06K 19/06* (2006.01)

(52) U.S. Cl.
CPC .............. *G06F 21/45* (2013.01); *G06F 16/27* (2019.01); *G06K 19/06037* (2013.01)

(58) Field of Classification Search
CPC .... G06F 21/45; G06F 16/27; G06K 19/06037
See application file for complete search history.

(56) References Cited

U.S. PATENT DOCUMENTS

| | | | |
|---|---|---|---|
| 10,942,997 B2 * | 3/2021 | Kao | G06F 21/32 |
| 2020/0013026 A1 * | 1/2020 | Noonan | G06Q 20/38215 |
| 2020/0342455 A1 * | 10/2020 | Poteet, III | G06Q 20/3829 |
| 2021/0034830 A1 * | 2/2021 | Govindaraj | H04L 63/0861 |

* cited by examiner

*Primary Examiner* — Viet D Vu
(74) *Attorney, Agent, or Firm* — MUNCY, GEISSLER, OLDS & LOWE, P.C.

(57) ABSTRACT

A dynamic consent management platform and a personal information management method thereof are provided. The dynamic consent management platform includes a dynamic consent module, a blockchain and a system database, and the personal information management method includes: the dynamic consent module transmitting an unsigned dynamic consent form to a signer module, wherein the unsigned dynamic consent form is generated according to personal data usage ss; the dynamic consent module receiving the signed dynamic consent form from the signer module, wherein the signed dynamic consent form is generated through an identity verification procedure; the dynamic consent module receiving a confirmation signal from the signer module as authorization to generate a decentralized identity verifiable certificate according to the identity verification procedure and the signed dynamic consent form; the blockchain receiving and recording the decentralized identity verifiable certificate; and the system database storing the signed dynamic consent forms.

17 Claims, 5 Drawing Sheets

The multi-factor authentication module identifying the identity of an operator from the signer module. — S91

DYNAMIC CONSENT MANAGEMENT PLATFORM AND PERSONAL INFORMATION MANAGEMENT METHOD THEREOF

BACKGROUND OF THE INVENTION

Technical Field of the Invention

The present invention relates to a personal data protection and management technology, and more particularly, to a dynamic consent management platform and its method for personal data management.

Background

In the past, when individuals authorized personal data for requesting units, these units would provide a physical consent form for the individual to sign. However, the costs associated with paper, printing, and delivery of the authorization consent form, as well as the time involved, were excessively high. Moreover, there was a lack of a verification record that could be used for third-party validation.

SUMMARY OF THE INVENTION

The present invention provides an electronic and verifiable dynamic consent management platform and its method for utilizing it in personal data management.

The personal data management method provided by this invention is applied to a dynamic consent management platform that includes a dynamic consent module, a blockchain, and a system database. The personal data management method comprises: The dynamic consent module generates and sends unsigned dynamic consent forms to the signer module, wherein the unsigned dynamic consent forms are generated based on the personal data usage requirements and include the authorized scope of personal data. The dynamic consent module receives signed dynamic consent forms from the signer module, wherein the signed dynamic consent forms are generated through an identity verification process. When the dynamic consent module receives confirmation signals from the signer module indicating acceptance of authorization, it generates a first decentralized identity verifiable certificate based on the identity verification process and the signed dynamic consent forms. The blockchain receives and records the first decentralized identity verifiable certificate. The system database stores the signed dynamic consent forms.

In one embodiment of the present invention, the personal data management method further comprises the dynamic consent module, which converts the first decentralized identity verifiable certificate into a quick response (QR) code.

In one embodiment of the present invention, the personal data management method further comprises that when the dynamic consent module receives a confirmation signal from the signer module for denial of authorization, it triggers a personal data destruction process to generate a second decentralized identity verifiable certificate. The blockchain receives and records the second decentralized identity verifiable certificate. The dynamic consent module converts the second decentralized identity verifiable certificate into a quick response (QR) code.

In one embodiment of the present invention, the dynamic consent management platform further comprises a destruction operation module, wherein the personal data destruction process comprises: The destruction operation module verifies the to-be-destroyed list, which includes the signed dynamic consent forms. The dynamic consent module receives an electronic signature from a witness to approve the to-be-destroyed list. The system database removes the to-be-destroyed list. The dynamic consent module records the image and instructions of the personal data destruction process to generate a second decentralized identity verifiable certificate.

In one embodiment of the present invention, the dynamic consent management platform further comprises a multi-factor authentication (MFA) module, wherein the identity verification process comprises the multi-factor authentication (MFA) module, which assesses the identity of the operator from the signer module.

The dynamic consent management platform provided by the present invention comprises a dynamic consent module, a message notification module connected to the dynamic consent module, a consent form management module connected to the dynamic consent module, a blockchain on-chain module connected to the consent form management module, a connected to the blockchain on-chain module, and a system database connected to the consent form management module. The dynamic consent module sends unsigned dynamic consent forms to the signer module via the message notification module, wherein the unsigned dynamic consent forms are generated based on the personal data usage requirements and include the authorized scope of personal data. The dynamic consent module receives signed dynamic consent forms from the signer module via the message notification module, wherein the signed dynamic consent forms are generated through an identity verification process. When the dynamic consent module receives confirmation signals from the signer module via the message notification module indicating acceptance of authorization, it generates a first decentralized identity verifiable certificate based on the identity verification process and the signed dynamic consent forms. The blockchain receives and records the first decentralized identity verifiable certificate via the consent form management module and the blockchain on-chain module. The system database stores the signed dynamic consent forms via the consent form management module.

In one embodiment of the present invention, the dynamic consent module converts the first decentralized identity verifiable certificate into a quick response (QR) code.

In one embodiment of the present invention, when the dynamic consent module receives a confirmation signal from the signer module via the message notification module for denial of authorization, it triggers a personal data destruction process to generate a second decentralized identity verifiable certificate. The blockchain receives and records the second decentralized identity verifiable certificate via the consent form management module and the blockchain on-chain module. The dynamic consent module converts the second decentralized identity verifiable certificate into a quick response (QR) code.

In one embodiment of the present invention, the dynamic consent management platform further comprises a destruction operation module connected to the consent form management module, the system database, and the blockchain on-chain module, wherein the personal data destruction process comprises: The destruction operation module verifies the to-be-destroyed list, which includes the signed dynamic consent forms. The dynamic consent module receives an electronic signature from a witness to approve the to-be-destroyed list. The system database removes the to-be-destroyed list. The dynamic consent module records the image and instructions of the personal data destruction process to generate a second decentralized identity verifiable certificate.

In one embodiment of the present invention, the dynamic consent management platform further comprises a multi-factor authentication (MFA) module connected to the dynamic consent module, wherein the identity verification process comprises the multi-factor authentication (MFA) module, which assesses the identity of the operator from the signer module.

In one embodiment of the present invention, the dynamic consent management platform further comprises a signer management module connected to the dynamic consent module. This module is used to filter signers based on personal data usage requirements.

In one embodiment of this invention, the dynamic consent management platform further comprises an authorization management module connected to the dynamic consent module. This module is used to provide a confirmation signal response mechanism to the signer module based on personal data usage requirements.

In one embodiment of the present invention, the dynamic consent module is used to provide multiple templates for dynamic consent forms.

In one embodiment of the present invention, the dynamic consent module is used to review the eligibility of external modules and generate unsigned dynamic consent forms in response to personal data usage requirements made by external modules.

In one embodiment of the present invention, the third-party verification module scans quick response (QR) codes for rapid verification of the correspondence between records on the blockchain and data in the system database.

The present invention, by employing blockchain technology and a personal data destruction process, not only achieves the goal of digitization but also provides data verification to prevent data tampering. Additionally, it allows signers to choose to authorize or deny authorization for the content of dynamic consent forms.

In order to make the above and other purposes, features, and advantages of the present invention more apparent and understandable, the following detailed description is provided with reference to specific embodiments and accompanying drawings.

DETAILED DESCRIPTION OF THE INVENTION

Figure 1:
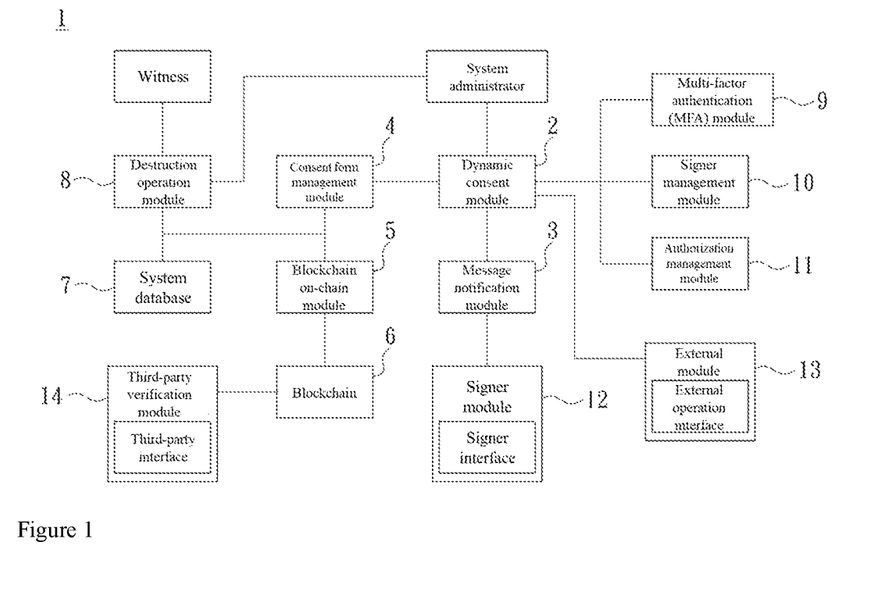
FIG. 1 is a system block diagram of a dynamic consent management platform provided in one embodiment of the present invention.

As shown in FIG. 1, it is a system block diagram of a dynamic consent management platform provided in one embodiment of the present invention. The dynamic consent management platform 1 provided by the present invention includes a dynamic consent module 2, a message notification module 3 connected to the dynamic consent module 2, a consent form management module 4 connected to the dynamic consent module 2, a blockchain on-chain module 5 connected to the consent form management module 4, a blockchain 6 connected to the blockchain on-chain module 5, a system database 7 connected to the consent form management module 4, a destruction operation module 8 connected to the consent form management module 4, the system database 7, and the blockchain on-chain module 5, a multi-factor authentication (MFA) module 9 connected to the dynamic consent module 2, a signer management module 10 connected to the dynamic consent module 2, and an authorization management module 11 connected to the dynamic consent module 2. Additionally, it should be noted that in the embodiment of the present invention, the modules, blockchain, databases, etc., included in the dynamic consent management platform 1 are implemented by hardware, circuits, or software combined with hardware, electronic devices, or electronic equipment.

In this embodiment, when an external module 13 submits a personal data usage requirement via an external operation interface, the system administrator of the dynamic consent management platform 1 reviews the eligibility of the external module 13 by operating through the system backend interface using the dynamic consent module 2. Initially, the dynamic consent module 2 checks whether the account of this external module 13 is a registered account or a new account. When the dynamic consent module 2 determines that the account of this external module 13 is a new account, the system administrator conducts the review through the system backend interface. If the account of this external module 13 does not pass the review, the personal data usage requirement submitted by the external module 13 will be rejected by the system administrator. However, if the account of this external module 13 passes the review or is already a registered account, the dynamic consent module 2 generates an unsigned dynamic consent agreement for the personal data usage requirement made by the external module 13. The dynamic consent module 2 provides multiple templates for dynamic consent forms to generate unsigned dynamic consent forms based on personal data usage requirement. The dynamic consent form includes the authorized scope of personal data, meaning that this dynamic consent form only approves the current use of personal data for a single instance.

In this embodiment, the signer management module 10 is used to manage signer accounts and the content of dynamic consent forms signed by signers. It can automatically set the contactable status of signers, the authorized scope of personal data usage, and automatically filter out a list of corresponding signers based on personal data usage requirement. The dynamic consent module 2 can select at least one signer from the signer list, with each signer corresponding to a signer module 12. The signer module 12 has a signer interface for signers to perform signing operations. Additionally, when a signer signs a dynamic consent form through the signer interface, the content of the agreement indicates whether the authorized scope of personal data for this instance is the same as the previous instance. If the authorized scope for this instance is the same as the previous instance, the signer only needs to confirm that the authorized scope of personal data is the same. However, if the authorized scope for this instance is different from the previous instance, the signer must confirm the changes to the authorized scope of personal data.

In this embodiment, the message notification module 3 is used when a dynamic consent form is generated as the communication port between the dynamic consent module 2 and the signer module 12. For example, the dynamic consent module 2 sends unsigned dynamic consent forms to the signer module 12 via the message notification module 3, and the dynamic consent module 2 receives signed dynamic consent forms from the signer module 12 via the message notification module 3.

In this embodiment, the multi-factor authentication module 9 is used to authenticate the identity of the signer, system administrator, and witness, such as through a one-time dynamic password (OTP), when a signer signs a dynamic consent form, and when the system administrator and the witness perform the personal data destruction process. For example, when the signer module 12 signs a dynamic consent form, the identity verification process is carried out to determine the identity of the operator from the signer module 12. After passing the identity verification process, the signed dynamic consent form is generated.

In this embodiment, when an external module 13 submits a personal data usage requirement, the authorization management module 11 is used to manage the confirmation and consent signal response mechanism from signers and system administrators, such as providing a confirmation signal response based on the personal data usage requirement to the signer module 12, allowing signers to authorize or deny the use of the signed dynamic consent form. For example, the dynamic consent module 2 receives a confirmation signal from the signer module 12 via the message notification module 3, indicating acceptance of authorization. It then generates the first decentralized identity verifiable certificate based on the identity verification process and the signed dynamic consent form. Similarly, the dynamic consent module 2 receives a confirmation signal from the signer module 12 via the message notification module 3, indicating a denial of authorization. It enables the personal data destruction process to generate the second decentralized identity verifiable certificate.

In this embodiment, when a signer denies the authorization of a signed dynamic consent form, the destruction operation module 8 is used for the personal data destruction process carried out by the witness and the system administrator. The personal data destruction process comprises the destruction operation module 8 confirming the to-be-destroyed list, which includes at least the signed dynamic consent form. The dynamic consent module 2 receives the electronic signature of the witness to confirm the identity of the witness, such as a lawyer, approving the to-be-destroyed list. The system database 7 removes the to-be-destroyed list, and the dynamic consent module 2 records images and instructions of the personal data destruction process to generate the second decentralized identity verifiable certificate.

In this embodiment, the blockchain 6 receives and records the first decentralized identity verifiable certificate and the second decentralized identity verifiable certificate via the consent form management module 4 and the blockchain on-chain module 5.

In this embodiment, the system database 7 is used to store all personal data provided by signers, including the signed dynamic consent forms. For example, the system database 7 receives and stores the signed dynamic consent forms via the consent form management module 4.

In this embodiment, the dynamic consent module 2 further comprises the conversion of verifiable credentials into quick response (QR) codes. For example, the dynamic consent module 2 converts the first decentralized identity verifiable certificate and the second decentralized identity verifiable certificate into two quick response (QR) codes. These quick response (QR) codes are used for the third-party verification module 14 to scan via a third-party verification interface, verifying the correspondence between the records on blockchain 6 and the data in system database 7.

Figure 2:
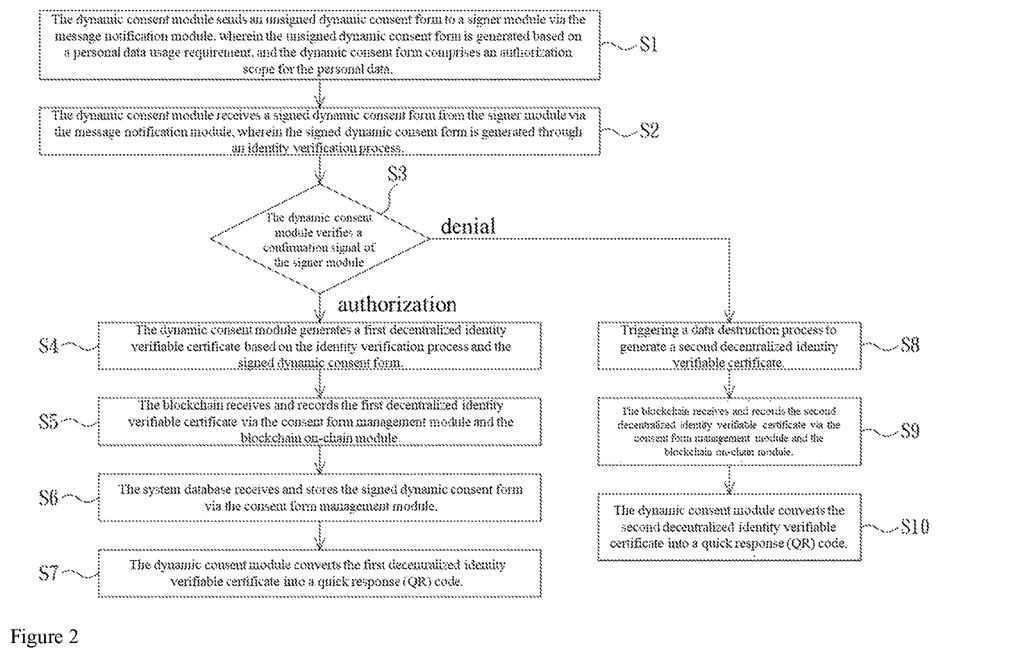
FIG. 2 is a flowchart of a personal data management method provided in one embodiment of the present invention.

As shown in FIG. 2, it is a flowchart of a personal data management method provided in one embodiment of the present invention. The dynamic consent management platform 1 provided by the present invention executes the personal data management method, comprising the following steps: Step S1: The dynamic consent module 2 generates and sends an unsigned dynamic consent form to the signer module 12 via the message notification module 3, wherein the unsigned dynamic consent form is generated based on the personal data usage requirements and includes the authorization scope for personal data. Step S2: The dynamic consent module 2 receives the signed dynamic consent form from the signer module 12 via the message notification module 3, wherein the signed dynamic consent form is generated through the identity verification process. Step S3: The dynamic consent module 2 identifies the confirmation signal from the signer module 12. If the confirmation signal is acceptance of authorization, proceed to Step S4; if the confirmation signal is denial of authorization, proceed to Step S8. Step S4: The dynamic consent module 2 generates the first decentralized identity verifiable certificate based on the identity verification process and the signed dynamic consent form. Step S5: The blockchain 6 receives and records the first decentralized identity verifiable certificate via the consent management module 4 and the blockchain on-chain module 5. Step S6: The system database 7 receives and stores the signed dynamic consent form via the consent management module 4. Step S7: The dynamic consent module 2 converts the first decentralized identity verifiable certificate into a Quick Response (QR) code. Step S8: Triggering the personal data destruction process to generate the second decentralized identity verifiable certificate. Step S9: The blockchain 6 receives and records the second decentralized identity verifiable certificate via the consent management module 4 and the blockchain on-chain module 5. Step S10: The dynamic consent module 2 converts the second decentralized identity verifiable certificate into a quick response (QR) code. In this embodiment, the content of the steps executed in the personal data destruction procedure is similar to what has been described above, and therefore, further elaboration is not provided. It should be noted that, in other embodiments, Step S3 may occur after Step S1 or before Step S2, allowing the signer to deny the dynamic consent form or authorize the personal data usage at any time. The present invention does not limit the position of Step S3 in the sequence.

Figure 3:
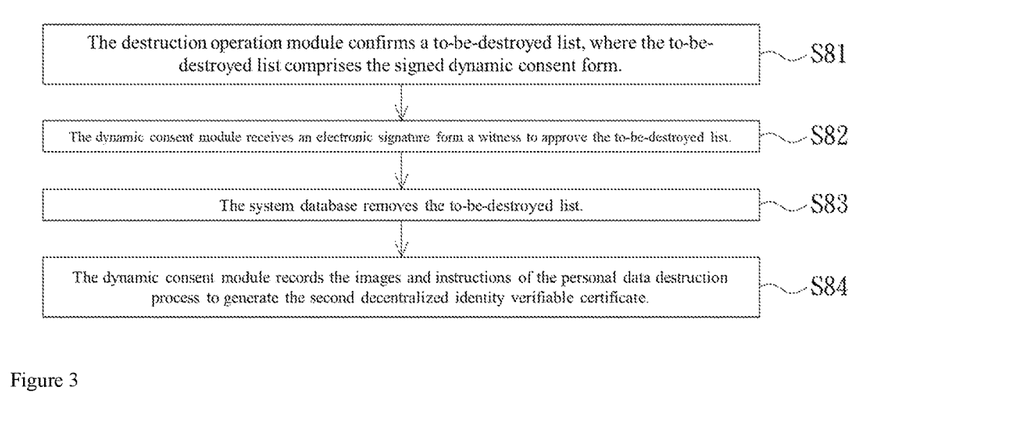
FIG. 3 is a flowchart of a personal data destruction procedure provided in one embodiment of the present invention.

As shown in FIG. 3, it is a flowchart of a personal data destruction procedure provided in one embodiment of the present invention. The personal data destruction procedure provided by the present invention comprises the following steps: Step S81: The destruction operation module 8 verifies the to-be-destroyed list, which at least includes the signed dynamic consent form. Step S82: The dynamic consent module 2 receives the electronic signature from the witness to approve the to-be-destroyed list. Step S83: The system database 7 removes the to-be-destroyed list. Step S84: The dynamic consent module 2 records images and instructions of the personal data destruction process to generate the second decentralized identity verifiable certificate. In this embodiment, the content of the steps executed in the personal data destruction procedure is similar to what has been described above, and therefore, further elaboration is not provided.

Figure 4:
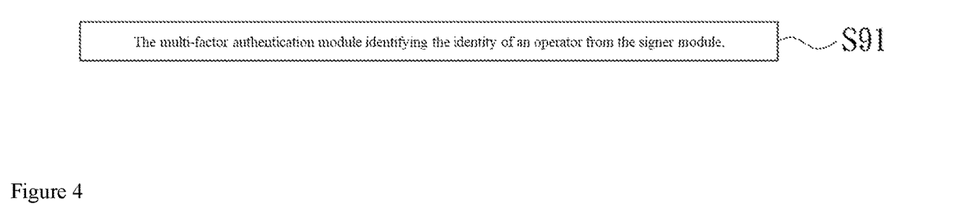
FIG. 4 is a flowchart of an identity verification procedure provided in one embodiment of the present invention.

As shown in FIG. 4, it is a flowchart of an identity verification procedure provided in one embodiment of the present invention. The identity verification procedure provided by the present invention comprises the following steps: Step S91: The multifactor authentication module 9 determines the identity of the operator from the signer module 12. In this embodiment, the content of the steps executed in the identity verification procedure is similar to what has been described above, and therefore, further elaboration is not provided.

Figure 5:
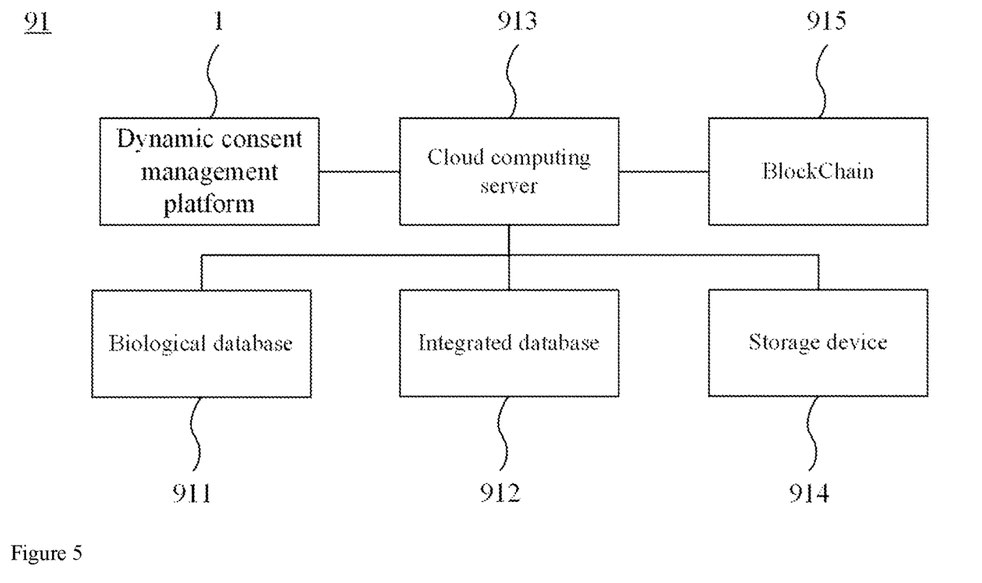
FIG. 5 is a schematic diagram of a data management system of a biological database provided by an embodiment of the present invention.

With reference to FIG. 5, it is a schematic diagram of a data management system of a biological database provided by an embodiment of the present invention, which uses dynamic consent management platform of the present invention described as above embodiments. The data management system 91 of the biological database provided by the present invention includes a biological database 911, an integrated database 912, a cloud computing server 913, a storage device 914, a BlockChain 915 and a Dynamic consent management platform 1. Wherein the integrated database 912, the storage device 914, the storage device 914, the BlockChain 915, and the Dynamic consent management platform 1 are coupled to the cloud computing server 913.

The Dynamic consent management platform 1 is the embodiment described above and FIG. 1. The biological database 911 is configured to collect biological data of a participant, wherein the biological data includes personal data and all data or information derived from specimens. In detail, the biological data provided by the participant includes, but not limited to, personal data and all data or information derived from specimens, and the biological database 911 collects and stores the biological data of all participants.

The integrated database 912 is configured to generate de-identified data according to the biological data and manage the de-identified data hierarchically. In detail, de-identification is a data processing technique, which is used to convert personal data of a participant into data through which the participant cannot be identified individually. In addition, the de-identified data is stored and managed hierarchically so as to improve the efficiency during data accessing when in use, wherein the hierarchical data includes, but not limited to, original personal data, coded and encrypted unlinked data, image data, medical record data, value-added data and raw data.

The cloud computing server 913 is configured to provide data analysis of the de-identified data. In detail, when the de-identified data is used for research and analysis, the cloud computing server 913 may perform related operations to obtain research data and analysis data.

The storage device 914 is configured to store an operation record of the integrated database 12. In detail, when the cloud computing server 913 is operated to access, these operation records will be stored in the storage device 914.

The BlockChain 915 is configured to store a Hash value of the operation record. In detail, the BlockChain 915 stores the Hash value of the operation record to achieve the effect of avoiding being tampered with.

In addition, the data management system 91 includes a plurality of external interfaces for connection and communication with electronic devices used by external institutions (interfaces are connected through the cloud computing server 913) and participants, such as but not limited to smart phones and computers, the plurality of external interfaces such as but not limited to a dynamic consent service interface, an ISO certification service auxiliary interface, a data application interface, a data review interface, a data use interface, a supervising system interface, a compliance certification interface and a checking and verification interface. For a specific embodiment of the present invention in FIG. 5, the Dynamic consent management platform 1 is included in the data management system 91.

The dynamic consent service interface connects the Dynamic consent management platform 1 and the cloud computing server 913, and is configured to provide the participant with a consent form to be signed (an unsigned dynamic consent form), a consent form to be changed (a dynamic consent form) and information about the use of the biological data. In detail, the dynamic consent service digitally provides the participant with the service of signing the consent form or changing the content of the consent form every time the biological data is authorized. The service type is a website or a mobile phone application. Meanwhile, the participant can be informed of certain information through this service. For example, when the biological data of the participant is released, the participant will be informed actively in order to meet the ISO standard, or when major problems are found after the biological data of the participant is analyzed, the participant may also be notified actively.

The ISO certification service auxiliary interface is configured to enable an assisting institution to assist the data management system 91 to obtain ISO certification. In detail, the assisting institution is to assist the biological database 911 and the integrated database 912 to obtain ISO certification, and the ISO certification service includes information security and conforms to the ISO standard of the biological database.

The data application interface is configured to enable an industry-university-research institution to apply for the use of the de-identified data. In detail, when the industry-university-research institution needs biological data of the biological database 911 for various research and analysis, the industry-university-research institution can apply for biological data or its data processing through the data application interface, and after the application is approved, the industry-university-research institution can obtain de-identified data such as biological data, or the cloud computing server 913 can perform related operations to obtain research data and analysis data of the de-identified data, but the industry-university-research institution can not directly obtain the biological data in the de-identified data, but obtain research data and analysis data generated by the biological data.

The data review interface is configured to provide a qualification review on the industry-university-research institution. In detail, when the industry-university-research institution needs the biological data of the biological database 911 for various research and analysis, the review unit can review the qualification of the industry-university-research institution through the data review interface so as to pass or reject data application.

The data use interface is configured to enable an industry-university-research institution to analyze de-identified data such as biological data. In detail, the industry-university-research institution can obtain the de-identified data through the data use interface, analyze on the cloud computing server to generate research data and analysis data.

The supervising system interface is configured to enable a supervising institution to supervise legal compliance of the operation record of the data management system 91. In detail, the supervising institution can supervise an overall architecture and a workflow of the data management system 91 through the supervising system interface to ensure that all work items are legal and compliant.

The compliance certification interface is configured to enable a certification institution to certify the integrated database. In detail, the certification institution can certify items that are required to be legal, such as an architecture, management and data use of the integrated database 912, through the compliance certification interface, and if the item passes the certification, the item will be issued with some form of certification stamp which has a time limit and needs to be re-certified upon the expiration of the time limit.

The checking and verification interface is configured to enable a checking and verification institution to check the legality of the operation record in the storage device 914, so as to generate a verification voucher and store the verification voucher in the BlockChain 915. In detail, the checking and verification institution can check the data management and use of the integrated database 912 through the checking and verification interface, mainly checking whether the data is legally used within the scope agreed by the participant, and whether the data of the participant is deleted according to the wishes of the participant when the participant applies for withdrawal. When the checking and verification institution completes each checking and verification, the checking and verification institution will issue a voucher of completion of checking and verification and store the voucher in the BlockChain 915 for certification.

Figure 6:
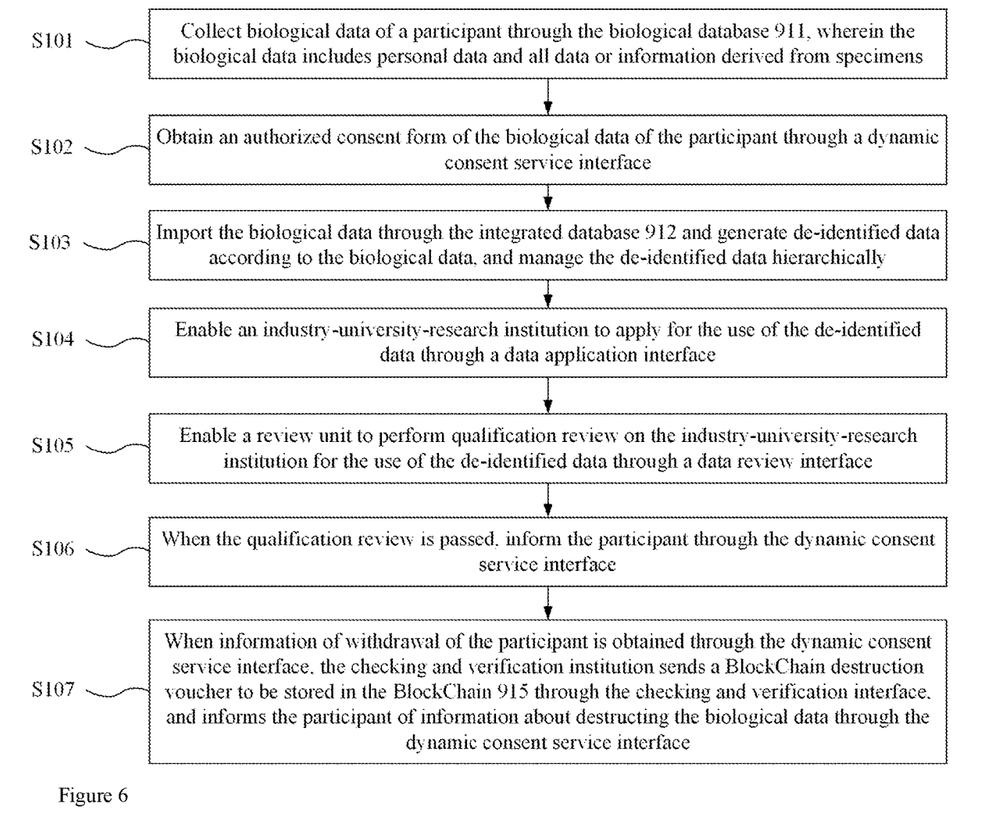
FIG. 6 is a flowchart of a data management method of a biological database provided by an embodiment of the present invention.

With reference to FIG. 6, it is a flowchart of a data management method of a biological database provided by an embodiment of the present invention. The data management method of the biological database is executed by the data management system 1 and includes the following steps. Step S101: collect biological data of a participant through the biological database 911, wherein the biological data includes personal data and all data or information derived from specimens. Step S102: obtain an authorized consent form of the biological data of the participant through a dynamic consent service interface. Step S103: import the biological data through the integrated database 912 and generate de-identified data according to the biological data, and manage the de-identified data hierarchically. Step S104: enable an industry-university-research institution to apply for the use of the de-identified data through a data application interface. Step S105: enable a review unit to perform qualification review on the industry-university-research institution for the use of the de-identified data through a data review interface. Step S106: when the qualification review is passed, inform the participant through the dynamic consent service interface. Step S107: when information of withdrawal of the participant is obtained through the dynamic consent service interface, the checking and verification institution sends a BlockChain destruction voucher to be stored in the BlockChain 915 through the checking and verification interface, and informs the participant of information about destructing the biological data through the dynamic consent service interface.

In detail, step S105 includes: when the industry-university-research institution wants to apply for the release and use of data (data needs to be exported and provided), the data can only be provided after being reviewed by the review unit of the integrated database 912; when the industry-university-research institution wants to apply for the use of data (data to be used in the cloud computing server 913 without being exported), the data needs to be reviewed by the review unit of the integrated database 912 before the data applied for use is analyzed in the cloud computing server 913; when the industry-university-research institution of international industry-university cooperation wants to apply for the release or use of data, whether it is necessary to export and transmit the data to the other party or not, the data must be reviewed by a superior review unit of the review unit of the integrated database 912 before continuing, and the checking and verification institution of the integrated database 912 must track the implementation of this case; and when the industry-university-research institution needs to invite participants to carry out clinical experiments, the industry-university-research institution actively invites the participants through the dynamic consent service interface, and the participants can reply through the dynamic consent service interface.

In detail, step S106 includes: when the qualification review is passed and the data is released for use, actively informing the participant through the dynamic consent service interface; when the data of the participant is found to be significant after analysis, actively informing the participant through the dynamic consent service interface; and after the data of the participant is used, if a data user gives back benefits, actively informing the participant through the dynamic consent service interface.

In addition, while the data management system 1 executes the data management method of the biological database, the supervising institution supervises whether all work of the integrated database 912 conforms to specifications through a supervising system interface; the assisting institution assists each biological database 911 and integrated database 912 to complete ISO certification through an ISO certification service auxiliary interface; the checking and verification institution checks and verifies the imported biological data through the checking and verification interface to ensure that the imported data itself is legal and compliant, and checks the operation record in the storage device 914 to confirm whether the data is used beyond the authorization of the participant, whether subsequent processing after the withdrawal of the participant is compliant, and whether the personal data after the withdrawal of the participant is actually destroyed; and the certification institution performs field certification through the compliance certification interface, periodically certifies that all the work of the integrated database 912 conforms to the specifications, and issues a BlockChain seal of a certification result to prove that the integrated database 912 passes the checking and conforms to the specifications.

To sum up, due to the adoption of the dynamic consent service, the BlockChain technology, the qualification review service, etc., the present invention becomes a biological data management system and method that can provide a service for a participant to authorize personal biological data, that can provide a service for verifying the legality of use of the personal biological data, and that can provide a service for an industry-university-research institution to apply for biological data.

Figure 7:
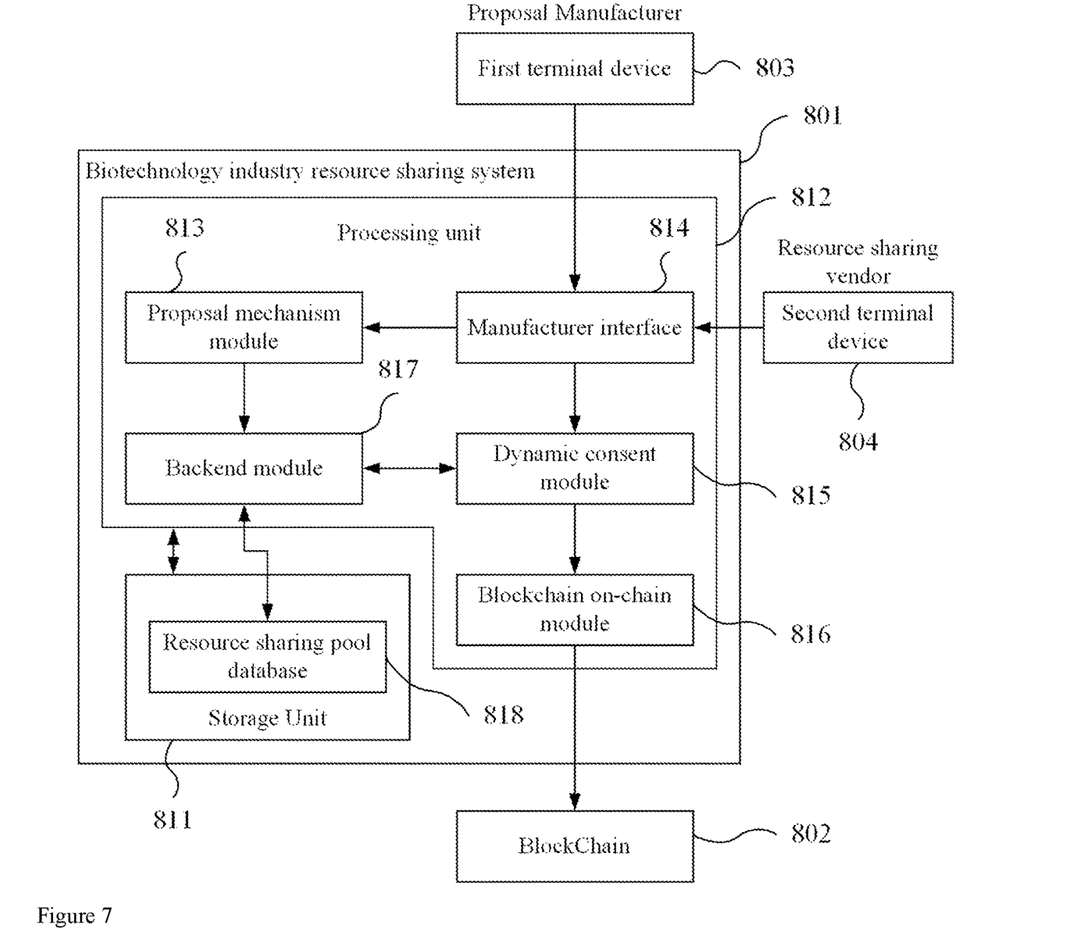
FIG. 7 is a block diagram of the main components of an embodiment of the new biotechnology industry resource sharing system.

Refer to FIG. 7, which is an embodiment of the new biotechnology industry resource sharing system (hereinafter referred to as the biotechnology industry resource sharing system 801). Specifically, the biotechnology industry resource sharing system 801 is a computer device, such as a server connected to the Internet, and can be connected to a blockchain 802, such as communicating through an Internet connection, and has a storage unit 811 (such as a memory module composed of a memory) and a processing unit 812 (such as a central processing unit or a microprocessor), wherein the storage unit 811 is electrically connected to the processing unit 812. The processing unit 812 can read a software program from the storage unit 811 and execute the software program to provide a proposal mechanism module 813, a manufacturer interface 814, a Dynamic consent module 815, a blockchain on-chain module 816 and a backend module 817. The backend module 817 can access a database pre-established in the storage unit 811, such as a resource sharing pool database 818. The resource sharing pool database 818 contains resources from a plurality of manufacturers (units) related to the biotechnology industry, such as human experiment or animal experiment data provided by manufacturers (units), human experiment centers, medical units (institutions), animal experiment centers, animal hospitals, etc. and other resources.

The manufacturer interface 814 is connected to the proposal mechanism module 813 and can be used by manufacturers related to the biotechnology industry to log in and operate through a terminal device to create a proposal in the proposal mechanism module 813. For example, a proposal manufacturer (such as a pharmaceutical company) develops a new drug to treat animals and needs to carry out animal experiments, the proposal manufacturer can log in to the manufacturer interface 814 through a first terminal device 803 and operate the manufacturer interface 814, so that in the proposal mechanism module 813 can establish a new drug trial proposal. The proposal mechanism module 813 is connected to the backend module 817. When the new drug trial proposal is established, the proposal mechanism module 813 provides the new drug trial proposal to the backend module 817, and the backend module 817 executes the subsequent management.

In addition, the backend module 817 is also responsible for managing members and/or manufacturers registered in the system, and maintaining and prompting relevant proposals.

The backend module 817 is also connected to the dynamic consent module 815, and executes a matching mechanism and searches the resource sharing pool database 818 according to a plan content of the new drug trial proposal transmitted from the proposal mechanism module 813. The resources of these manufacturers are used to provide resources (such as resources related to animal new drug testing) to at least one manufacturer of the proposal manufacturer, such as a certain (or several) animal experimental center and/or a certain (or several) animal hospitals, and notify (for example, through email or other feasible communication methods) the at least one manufacturer that has been matched. Then, the backend module 817 generates a digital consent form related to the proposal manufacturer and the at least one manufacturer based on the matching results, and provides the digital consent form to the dynamic consent module 815.

When the matched at least one vendor (resource sharing vendor) receives a notification from the system 801 and is willing to provide (share) its resources stored in the resource sharing pool database 818 to the proposed vendor, the at least one vendor can log in and operate the second terminal device 804 through the manufacturer interface 814, to check the digital consent stored in the dynamic consent module 815, and the digital consent can be compared with the digital consent through the dynamic consent module 815. The at least one manufacturer agrees and authorizes an authorized content related to itself, thereby generating an authorized consent form.

Then, the dynamic consent module 815 provides the authorized consent form to the blockchain on-chain module 816, causing the blockchain on-chain module 816 uploads the authorized consent form to the blockchain 802, in order to save and ensure that the authorized consent form will not be arbitrarily changed, and to achieve the purpose of matching the resources in the resource sharing pool database 818 to manufacturers in need.

It is worth mentioning that, in addition to legal persons, companies, agencies, schools and other institutions related to the biotechnology industry, the above-mentioned proposal manufacturers or the manufacturers that provide resources to the resource sharing pool database 818 can also be individuals.

Moreover, the backend module 817 also stores the authorized consent form. When the proposal manufacturer wants to obtain the resources authorized to be used by the at least one manufacturer in the resource sharing pool database 818, the first terminal device 803 of the proposal manufacturer can raise a request of obtained authorized resources to the backend module 817 through the manufacturer interface 814 and the proposal mechanism module 813. Then, the backend module 817 reads the authorized consent form according to the request of obtained authorized resources. And according to the authorization content related to the at least one manufacturer in the authorized consent form, an authorized resource of the at least one manufacturer is obtained from the resource sharing pool database 818, and through the proposal mechanism module 813 and the manufacturer interface 814 provides the authorized resources to the first terminal device 803. In this way, the purpose of resource sharing is achieved.

In addition, the at least one manufacturer that authorizes the proposal manufacturer to use the resources in the resource sharing pool database 818 can also view the backend module 817 through the manufacturer interface 814 and the proposal mechanism module 813 via the second terminal device 804 which manages the progress of the plan content of the new drug trial proposal, then the at least one manufacturer can provide further suggestions.

To sum up, the above embodiment searches the resource sharing pool database 818 for the proposal content established by the proposal manufacturer in the biotechnology industry resource sharing system 801, so as to match at least one manufacturer that can provide resources to the proposal manufacturer. After the at least one manufacturer agrees to match and authorize the use of its resources stored in the resource sharing pool database 818 in the biotechnology industry resource sharing system 801, the biotechnology industry resource sharing system 801 obtains the authorized resources from the resource sharing pool database 818 according to the request of the proposing manufacturer to obtain the authorized resources. At least one manufacturer authorizes the resources used by the proposal manufacturer to be used by the proposal manufacturer, thereby matching resources to manufacturers in need in a timely manner, speeding up the time for the proposal manufacturer to complete the proposal, and thus effectively shortening the development cycle and schedule of biotech medicine. And create a mutually beneficial and win-win situation for all units of industry, academia and research, to achieve the efficacy and purpose of this new model.

In summary, the dynamic consent management platform and its method for utilizing it in personal data management provided by the present invention employ blockchain technology and a personal data destruction process. As a result, besides achieving the goal of digitization, the present invention provides data verification to prevent data tampering and allows signers to choose to authorize or deny the content of the dynamic consent form.

The disclosure of the above embodiments is intended to illustrate the present invention, and it is not intended to limit the scope of the invention. Those skilled in the relevant art, within the spirit and scope of the present invention, may make slight modifications and refinements. Therefore, the protection scope of the present invention should be determined based on the appended claims in any subsequent patent application.

The invention claimed is:

1. A personal data management method is applied to a dynamic consent management platform, wherein the dynamic consent management platform comprises a dynamic consent module, a blockchain, and a system database, the personal data management method comprises:
    the dynamic consent module generates and sends an unsigned dynamic consent form to a signer module, wherein the unsigned dynamic consent form is generated based on a personal data usage requirement, and the dynamic consent form comprises an authorization scope for the personal data;
    the dynamic consent module receives a signed dynamic consent form from the signer module, wherein the signed dynamic consent form is generated through an identity verification process;
    when the dynamic consent module receives a confirmation signal from the signer module indicating acceptance of authorization, the dynamic consent module generates a first decentralized identity verifiable certificate based on the identity verification process and the signed dynamic consent form;
    the blockchain receives and records the first decentralized identity verifiable certificate;
    the system database stores the signed dynamic consent form;
    when the dynamic consent module receives a confirmation signal from the signer module indicating denial of authorization, it triggers a personal data destruction process to generate a second decentralized identity verifiable certificate;
    the blockchain receives and records the second decentralized identity verifiable certificate; and
    the dynamic consent module converts the second decentralized identity verifiable certificate into a quick response (OR) code.

2. The personal data management method according to claim 1 further comprising:
    the dynamic consent module converts the first decentralized identity verifiable certificate into a quick response (QR) code.

3. The personal data management method according to claim 1, wherein the dynamic consent management platform further comprises a destruction operation module;

wherein the personal data destruction process comprises:
    the destruction operation module verifies a to-be-destroyed list, wherein the to-be-destroyed list comprises the signed dynamic consent form;
    the dynamic consent module receives an electronic signature from a witness to approve the to-be-destroyed list;
    the system database removes the to-be-destroyed list; and
    the dynamic consent module records the images and instructions of the personal data destruction process to generate the second decentralized identity verifiable certificate.

4. The personal data management method according to claim 1, wherein the dynamic consent management platform further comprises a multi-factor authentication (MFA) module;
    wherein the authentication process comprises:
        the multi-factor authentication (MFA) module identifies the identity of an operator from the signer module.

5. A dynamic consent management platform, comprising:
    a dynamic consent module;
    a message notification module connected to the dynamic consent module;
    a consent form management module connected to the dynamic consent module;
    a blockchain on-chain module connected to the consent form management module;
    a blockchain connected to the blockchain on-chain module;
    a system database connected to the consent form management module; and
    a destruction operation module connected to the consent form management module, the system database, and the blockchain on-chain module;
    wherein the dynamic consent module sends an unsigned dynamic consent form to a signer module via the message notification module, wherein the unsigned dynamic consent form is generated based on a personal data usage requirement, and the dynamic consent form comprises an authorization scope for the personal data;
    wherein the dynamic consent module receives a signed dynamic consent form from the signer module via the message notification module, wherein the signed dynamic consent form is generated through an identity verification process;
    wherein when the dynamic consent module receives a confirmation signal from the signer module via the message notification module indicating acceptance of authorization, the dynamic consent module generates a first decentralized identity verifiable certificate based on the identity verification process and the signed dynamic consent form;
    wherein the blockchain receives and records the first decentralized identity verifiable certificate via the consent form management module and the blockchain on-chain module;
    wherein the system database receives and stores the signed dynamic consent form via the consent form management module;
    wherein when the dynamic consent module receives a confirmation signal from the signer module via the message notification module indicating denial of authorization, it triggers a data destruction process to generate a second decentralized identity verifiable certificate; the blockchain receives and records the second decentralized identity verifiable certificate via the consent form management module and the blockchain on-chain module; and the dynamic consent module converts the second decentralized identity verifiable certificate into a quick response (QR) code; and wherein the personal data destruction process comprises the destruction operation module confirming a to-be-destroyed list, which comprises the signed dynamic consent form; The dynamic consent module receives an electronic signature of witness to approve the to-be-destroyed list; the system database removes the to-be-destroyed list; and the dynamic consent module records the images and instructions of the personal data destruction process to generate the second decentralized identity verifiable certificate.

6. The dynamic consent management platform according to claim 5, further comprises a multi-factor authentication (MFA) module connected to the dynamic consent module, wherein the authentication process comprises the multi-factor authentication module identifying the identity of an operator from the signer module.

7. The dynamic consent management platform according to claim 5, further comprises a signer management module, connected to the dynamic consent module, is used to filter and select corresponding signers based on the personal data usage requirement.

8. The dynamic consent management platform according to claim 5, further comprises an authorization management module, connected to the dynamic consent module, is used to provide a response mechanism for the confirmation signal to the signer module based on the personal data usage requirement.

9. The dynamic consent management platform according to claim 5, wherein the dynamic consent module is used to provide multiple templates for the dynamic consent form.

10. The dynamic consent management platform according to claim 5, wherein the dynamic consent module is used to review the qualifications of an external module to generate an unsigned dynamic consent form for the personal data usage requirement presented by the external module.

11. A data management system of a biological database, comprising:
a cloud computing server, configured to provide data analysis of the de-identified data;
a biological database, coupled to the cloud computing server, and configured to collect biological data of a participant, wherein the biological data comprises personal data and all data or information derived from specimens;
an integrated database, coupled to the cloud computing server, and configured to generate de-identified data according to the biological data and manage the de-identified data hierarchically;
a storage device, coupled to cloud computing server, and configured to store an operation record of the integrated database; and
a BlockChain coupled to the cloud computing server, and configured to store a Hash value of the operation record;
wherein the data management system comprises a dynamic consent management platform, coupled to the cloud computing server, configured to provide the participant with an unsigned dynamic consent form to be signed, a dynamic consent form to be changed and information about the use of the biological data;
the dynamic consent management platform comprising:
a dynamic consent module;
a message notification module connected to the dynamic consent module;
a consent form management module connected to the dynamic consent module;
a blockchain on-chain module connected to the consent form management module, and the blockchain is connected to the blockchain on-chain module through the cloud computing server; and
a system database connected to the consent form management module,
wherein the dynamic consent module sends the unsigned dynamic consent form to a signer module via the message notification module, wherein the unsigned dynamic consent form is generated based on a personal data usage requirement, and the dynamic consent form comprises an authorization scope for the personal data;
wherein the dynamic consent module receives a signed dynamic consent form from the signer module via the message notification module, wherein the signed dynamic consent form is generated through an identity verification process;
wherein when the dynamic consent module receives a confirmation signal from the signer module via the message notification module indicating acceptance of authorization, the dynamic consent module generates a first decentralized identity verifiable certificate based on the identity verification process and the signed dynamic consent form;
wherein the blockchain receives and records the first decentralized identity verifiable certificate via the consent form management module and the blockchain on-chain module; and
wherein the system database receives and stores the signed dynamic consent form via the consent form management module.

12. The data management system of a biological database according to claim 11, in the dynamic consent management platform, wherein when the dynamic consent module receives a confirmation signal from the signer module via the message notification module indicating denial of authorization, it triggers a data destruction process to generate a second decentralized identity verifiable certificate; the blockchain receives and records the second decentralized identity verifiable certificate via the consent form management module and the blockchain on-chain module; and the dynamic consent module converts the second decentralized identity verifiable certificate into a quick response (QR) code.

13. The data management system of a biological database according to claim 12, in the dynamic consent management platform, further comprises a destruction operation module connected to the consent form management module, the system database, and the blockchain on-chain module, wherein the personal data destruction process comprises the destruction operation module confirming a to-be-destroyed list, which comprises the signed dynamic consent form; The dynamic consent module receives an electronic signature of witness to approve the to-be-destroyed list; the system database removes the to-be-destroyed list; and the dynamic consent module records the images and instructions of the personal data destruction process to generate the second decentralized identity verifiable certificate.

14. The data management system of a biological database according to claim 11, in the dynamic consent management platform, further comprises a multi-factor authentication (MFA) module connected to the dynamic consent module, wherein the authentication process comprises the multi-factor authentication module identifying the identity of an operator from the signer module.

15. The data management system of a biological database according to claim 11, in the dynamic consent management platform, further comprises a signer management module, connected to the dynamic consent module, is used to filter and select corresponding signers based on the personal data usage requirement.

16. The data management system of a biological database according to claim 11, in the dynamic consent management platform, further comprises an authorization management module, connected to the dynamic consent module, is used to provide a response mechanism for the confirmation signal to the signer module based on the personal data usage requirement.

17. The dynamic consent management platform according to claim 11, wherein the dynamic consent module is used to review the qualifications of an external module to generate an unsigned dynamic consent form for the personal data usage requirement presented by the external module.

\* \* \* \* \*